United States Patent
Wiebe et al.

(10) Patent No.: US 11,170,302 B2
(45) Date of Patent: Nov. 9, 2021

(54) RANDOMIZED GAP AND AMPLITUDE ESTIMATION

(71) Applicant: Microsoft Technology Licensing, LLC, Redmond, WA (US)

(72) Inventors: Nathan Wiebe, Redmond, WA (US); Ilia Zintchenko, Zurich (CH)

(73) Assignee: Microsoft Technology Licensing, LLC, Redmond, WA (US)

( * ) Notice: Subject to any disclaimer, the term of this patent is extended or adjusted under 35 U.S.C. 154(b) by 709 days.

(21) Appl. No.: 15/999,860

(22) PCT Filed: Feb. 17, 2017

(86) PCT No.: PCT/US2017/018376
§ 371 (c)(1),
(2) Date: Aug. 20, 2018

(87) PCT Pub. No.: WO2017/143195
PCT Pub. Date: Aug. 24, 2017

(65) Prior Publication Data
US 2020/0193302 A1    Jun. 18, 2020

Related U.S. Application Data

(60) Provisional application No. 62/297,062, filed on Feb. 18, 2016.

(51) Int. Cl.
*G06N 10/00* (2019.01)
*G06N 3/12* (2006.01)
(Continued)

(52) U.S. Cl.
CPC ............. *G06N 3/126* (2013.01); *G06F 17/16* (2013.01); *G06N 7/005* (2013.01); *G06N 10/00* (2019.01)

(58) Field of Classification Search
None
See application file for complete search history.

(56) References Cited

U.S. PATENT DOCUMENTS

2009/0259905 A1* 10/2009 Silva .................. G06N 10/00
714/746

FOREIGN PATENT DOCUMENTS

WO    2015085190 A2    6/2015

OTHER PUBLICATIONS

Low, Richard Andrew. "Pseudo-randomness and Learning in Quantum Computation" 2010 [ONLINE] Downloaded Jul. 1, 2021 https://arxiv.org/pdf/1006.5227.pdf (Year: 2010).*

(Continued)

*Primary Examiner* — Ben M Rifkin
(74) *Attorney, Agent, or Firm* — Klarquist Sparkman, LLP

(57) ABSTRACT

Methods and apparatus are provided that permit estimation of eigenphase or eigenvalue gaps in which random or pseudo-random unitaries are applied to a selected initial quantum state to produce a random quantum state. A target unitary is then applied to the random quantum state one or more times, or an evolution time is allowed to elapse after application of the target unitary. An inverse of the pseudo-random unitary used to produce the random quantum state is applied, and the resultant state is measured with respect to the initial quantum state. Measured values are used to produce Bayesian updates, and eigenvalue/eigenvector gaps are estimated. In some examples, the disclosed methods are used in amplitude estimate and control map determinations. Eigenvalue gaps for time-dependent Hamiltonians can be evaluated by adiabatic evolution of the Hamiltonian from an initial Hamiltonian to a final Hamiltonian.

20 Claims, 8 Drawing Sheets

(51) Int. Cl.
G06F 17/16 (2006.01)
G06N 7/00 (2006.01)

(56) References Cited

OTHER PUBLICATIONS

Dankert, Christoph et al. "Exact and approximate unitary 2-designs and their application to fidelity estimation" 2009 [ONLINE] Downloaded Jul. 1, 2021 https://journals.aps.org/pra/pdf/10.1103/PhysRevA.80.012304 (Year: 2009).*
Santha, Mikos. "Quantum walk based search algorithms" 2008 [ONLINE] Downloaded Jul. 1, 2021 https://arxiv.org/pdf/0808.0059.pdf (Year: 2008).*
Benenti et al., "Principles of Quantum Computation and Information, vol. 1: Basic Concepts," World Scientific Publishing Co. Pte. Ltd., 273 pages (Oct. 2004).
Mosca, "Counting by Quantum Eigenvalue Estimation," Theoretical Computer Science, 264:1-8, (Aug. 6, 2001).
Boixo et al., "Eigenpath Traversal by Phase Randomization," Quantum Information and Computation, 9:833-855, (Sep. 2009).
Emerson et al., "Estimation of the Local Density of States on a Quantum Computer," available at: http://arxiv.org/pdf/0308164v2, pp. 1-4, (Aug. 29, 2003).
Mehrdoust, "A Randomized Algorithm for Estimating the Condition Number of Matrices," Math. Reports, 15:203-210 (Jan. 2013).
Geller et al., "Universal quantum simulation with prethreshold superconducting qubits: Single-excitation subspace method," Physical Review A, 91:062309-1-062309-23 (Jun. 8, 2015).
Brown et al., "Quantum pseudo-randomness from cluster-state quantum computation," available at: http://arxiv.org/pdf/0802.2675v3, pp. 1-5 (May 15, 2008).
Nguyen et al., "Random Matrices: Tail Bounds For Gaps between Eigenvalues," available at: http://arxiv.org/pdf/1504.00396v3, pp. 1-40 (May 2, 2015).
Mosca, "Quantum Searching, Counting and Amplitude Amplification by Eigenvector Analysis," Proceedings of 23rd International Symposium on Mathematical Foundations of Computer Science, 11 pages (Aug. 24, 1998).
Meter et al., "Distributed Quantum Computation Architecture Using Semiconductor Nanophotonics," available at: http://arxiv.org/pdf/0906.2686v2, pp. 1-29 (Sep. 17, 2009).
"The Hamiltonian," available at: http://hyperphysics.phy-astr.gsu.edu/hbase/quantum/hamil.html, 1 page (Feb. 23, 2002).
"Time Dependent Schrodinger Equation; Free-Particle Wave Function; Free Particle Waves; Time Independent Schrodinger Equation; Energy Eigenvalues; 1-D Schrodinger Equation," available at: http://hyperphysics.phy-astr.gsu.edu/hbase/quantum/scheq.html#c5, 5 pages (Dec. 6, 1999).
Dankert et al., "Exact and approximate unitary 2-designs and their application to fidelity estimation," Physical Review A, 80:012304-1-012304-6 (Jul. 6, 2009).
Granade et al., "Robust online Hamiltonian learning," New Journal of Physics, 14:1-31 (Oct. 3, 2012).
Harrow et al., "Random Quantum Circuits Are Approximate 2-designs," available at: http://arxiv.org/pdf/0802.1919v2, pp. 1-48 (Jun. 9, 2009).
Kitaev, "Quantum measurements and the Abelian Stabilizer Problem," Electronic Colloquium on Computational Complexity, pp. 1-22 (Nov. 22, 1995).
Skiena et al., "Reconstructing Sets from Interpoint Distances," Proceedings of the Sixth Annual Symposium on Computational Geometry, pp. 332-339 (May 1990).
Svore et al., "Faster Phase Estimation", available at: http://arxiv.org/pdf/1304.0741v1, pp. 1-14 (Apr. 2, 2013).
Wiebe et al., "Quantum bootstrapping via compressed quantum Hamiltonian learning," New Journal of Physics, 17:1-21 (Feb. 13, 2015).
Watrous, "Theory of Quantum Information," Lecture Notes of University of Waterloo, 173 pages, retrieved on: Dec. 28, 2015.
Wiebe et al., "Hamiltonian Learning and Certification Using Quantum Resources," available at: http://arxiv.org/pdf/1309.0876v1, pp. 1-16 (Sep. 4, 2013).
Wiebe et al., "Quantum Hamiltonian Learning Using Imperfect Quantum Resources," available at: http://arxiv.org/pdf/1311.5269v2, pp. 1-18 (Apr. 1, 2014).
Zyczkowski et al., "Random unitary matrices," J. Phys. A: Math. Gen. 27:4235-4245 (Jun. 1994).
Brassard et al., "Quantum Amplitude Amplification and Estimation," available at: http://arxiv.org/pdf/quant-ph/0005055v1, pp. 1-32 (May 2, 2000).
Wiebe et al., "Efficient Bayesian Phase Estimation," available at: http://arxiv.org/pdf/1508.00869v1, pp. 1-12 (Aug. 4, 2015).
International Search Report and Written Opinion from International Application No. PCT/US2017/018376, dated May 26, 2017, 14 pages.
Nechita, "Asymptotics of Random Density Matrices," Annales Henri Poincare, 8:1521-1538 (Nov. 22, 2007).
Wallman et al., "Randomized Benchmarking with Confidence," available at: http://arxiv.org/pdf/1404.6025v4, pp. 1-31 (Dec. 17, 2015).
Granade et al., "Accelerated randomized benchmarking," New Journal of Physics, 17:1-10 (Jan. 20, 2015).
Zintchenko et al., "Randomized gap and amplitude estimation," available at: http://arxiv.org/pdf/1603.03672v1, pp. 1-14 (Mar. 11, 2016).
Nechita, "Asymptotics of Random Density Matrices," available at: http://arxiv.org/pdf/0702154v3, pp. 1-17 (Jun. 19, 2007).
International Preliminary Report on Patentability from International Application No. PCT/US2017/018376, dated Sep. 24, 2018, 9 pages.
Zintchenko et al., "Randomized gap and amplitude estimation," available at: http://arxiv.org/pdf/1603.03672v2, pp. 1-15 (Jun. 14, 2016).
Office Action issued in European Patent Application No. 17708118.9, dated Jul. 1, 2021, 7 pages.

* cited by examiner

RANDOMIZED GAP AND AMPLITUDE ESTIMATION

CROSS REFERENCE TO RELATED APPLICATIONS

This is the U.S. National Stage of International Application No. PCT/US2017/018376, filed Feb. 17, 2017, which was published in English under PCT Article 21(2), which in turn claims the benefit of U.S. Provisional Application No. 62/297,062, filed Feb. 18, 2016. The provisional application is incorporated herein in its entirety.

FIELD OF THE INVENTION

The invention pertains to eigenphase determination in quantum computing.

BACKGROUND OF THE INVENTION

Phase estimation is a technique of fundamental importance to quantum computing. It is not only necessary for the exponential speedup in Shor's factoring algorithm but also is responsible for quadratic performance improvements in quantum simulation. The goal of phase estimation is to estimate the eigenvalue associated with an input eigenstate, or more generally to sample from the eigenvalues in the support of an input state vector. This process works by using a control register that is prepared in a quantum superposition and then a unitary, whose eigenvalues are sought, is applied to the system controlled a number of times that is specified by the value of the control register. There are several ways that this process can be performed but a commonality between them is that all of these approaches require at least one qubit to control the process as well as the ability to perform a controlled variant of the unitary evolution.

The need for external control substantially limits the uses of phase estimation on existing hardware not only because of the additional cost of ancilla qubits, but also because controlled operations are typically much more difficult to perform than corresponding uncontrolled operations. On the other hand, if such experiments were possible then many tasks, such as the characterization of an unknown Rabi frequency, could be performed using quadratically less experimental time and exponentially fewer measurements.

SUMMARY

The disclosure pertains to quantum methods and circuits for eigenvalue and eigenphase estimation for unitary or Hamiltonian operators. A random or pseudo-random unitary is applied to an initial quantum state and then a target unitary is applied. An inverse of the random or pseudo-random unitary is then applied, followed by a measurement of the resulting quantum state with respect to the initial state. Measurement results are used to provide an update for Bayesian estimation. Typically, the target unitary is allowed to time-evolve (for a Hamiltonian operator) or is applied multiple times prior to application of the inverse of the random unitary. The initial state can correspond to a zero state but other initial states can be used. Multiple different random or pseudo-random unitaries can be used. Applications include determination of control maps and determination of eigenvalue gaps in time-dependent Hamiltonians.

Quantum computation systems comprise at least one qubit and a set of quantum circuits implementing random or pseudo-random unitaries and a corresponding set of unitaries implementing inverses of the random unitaries. A quantum circuit implementing a target unitary is coupled to a selected quantum circuit implementing a random unitary so that the target unitary is applied to a corresponding random quantum state. A quantum circuit implementing the inverse of the selected quantum circuit is situated to be applied to the at least one qubit after the corresponding random quantum state is evolved to produce an output quantum state. A measurement circuit is coupled to the at least one qubit so as to receive and measure the output quantum state with respect to an initial state of the at least one qubit. Typically, eigenvalue or eigenphase estimates are updated using the measured values using Bayesian estimation; however other inference procedures can also be applied.

These and other features and aspects of the disclosure are set forth below with reference to the accompanying drawings.

DETAILED DESCRIPTION

Figures 1A, 1B, 1C:
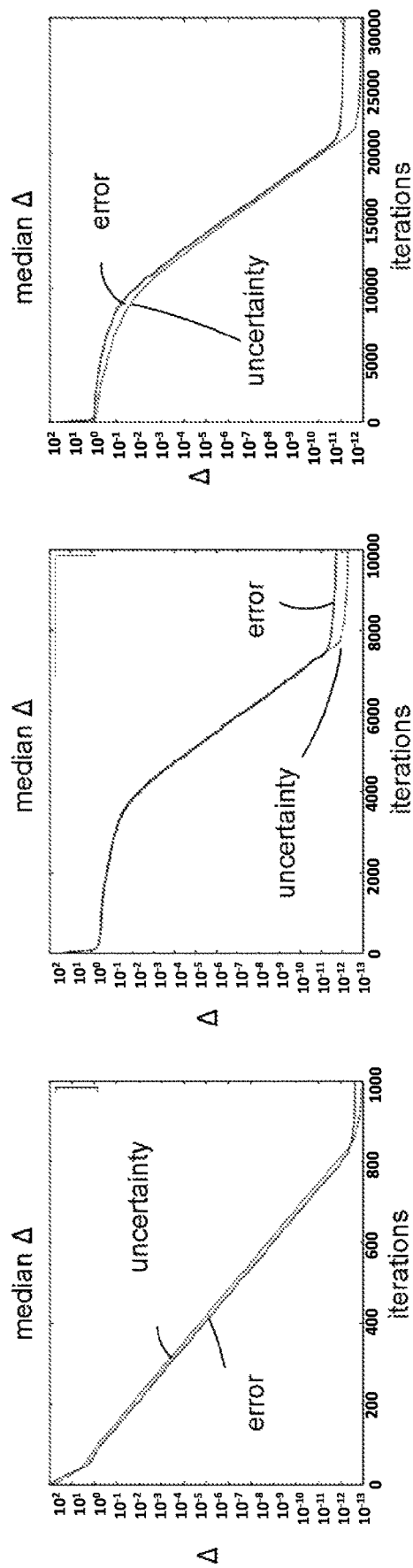
FIGS. 1A-1C show median error and uncertainty in determining gaps in Hamiltonian eigenphases using rejection filtering for 2-level, 3-level, and 4-level Hamiltonians, respectively, with eigenspectra drawn from the Gaussian Unitary Ensemble.

Disclosed herein are alternative approaches to phase estimation that can be used to learn spectral gaps in an uncharacterized device without the need for ancilla qubits. However, as the number of such gaps typically grows exponentially with the number of qubits in the system, the disclosed approaches are typically applied to small systems. The disclosed methods and apparatus generally use random operations to extract information about the underlying dynamics of a system. Applications to in-place amplitude estimation and quantum device calibration are also disclosed.

As used in this application and in the claims, the singular forms a, an, and the include the plural forms unless the context clearly dictates otherwise. Additionally, the term includes means comprises. Further, the term coupled does not exclude the presence of intermediate elements between the coupled items.

The systems, apparatus, and methods described herein should not be construed as limiting in any way. Instead, the present disclosure is directed toward all novel and nonobvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like produce and provide to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus are referred to as lowest, best, minimum, or the like. It will be appreciated that such descriptions are intended to indicate that a selection among many used functional alternatives can be made, and such selections need not be better, smaller, or otherwise preferable to other selections. In some examples, unitary operators ("unitaries") are referred to as random, but as used herein, such random unitaries include pseudo-random unitaries. Unitaries have eigenvalues of magnitude one, but can have various phases which can be referred to as eigenphases. As used herein, eigenvalue or eigenphase differences are referred to generically as eigenvalue differences unless otherwise noted.

Disclosed below are methods and apparatus that provide phase estimation using Bayesian inference with randomized experiments to learn spectral gaps of a unitary operation without needing external qubits or well calibrated gates. Several applications of the disclosed methods such as amplitude estimate and control map determination are also provided.

Bayesian Inference

Bayesian inference can be used to extract information from a system. The goal of Bayesian inference is to compute the probability that a hypothesis is true given evidence E and a set of prior beliefs about the hypotheses. These prior beliefs are represented as a probability distribution referred to herein as a prior. This prior, along with evidence E, can be thought of as inputs to an inference algorithm. The output of the algorithm is a posterior distribution P(x|E), which is given by Bayes' theorem as:

$$P(x \mid E) = \frac{P(E \mid x)P(x)}{\int P(E \mid x)P(x)dx}, \quad (1)$$

wherein P(E|x) is known as a likelihood function. The posterior distribution output by this process is then used as a prior distribution in online inference algorithms and this process of generating a new prior distribution using Bayes' theorem is known as a Bayesian update.

If P(x) has support over an infinite number of points, then exact Bayesian inference is usually intractable and discretizations can be used. Such discretizations include particle filter methods and sequential Monte Carlo methods. In the disclosed examples, rejection filter inference is used. Rejection filter inference can be very fast, easy to parallelize, and can be implemented using far less memory than particle filter or sequential Monte-Carlo methods.

Rejection filter inference uses rejection sampling to perform an update. In such methods, rejection sampling is used to convert an ensemble of samples from the prior distribution to a smaller set of samples from the posterior distribution. Specifically, if evidence E is observed and a sample is drawn from the prior distribution and accepted with probability equal to P(E|x), then the probability that hypothesis x is accepted as a sample is, from Bayes' theorem:

$$P(E \mid x)P(x) \propto P(x \mid E) \quad (2)$$

Therefore the samples that pass through the rejection filter are distributed according to the posterior distribution.

Although this process allows sampling from the posterior distribution, it is not efficient. Every update will, on average, reject a constant fraction of samples. This means that the number of samples kept will shrink exponentially with the number of updates. This process can be made more efficient by fitting these samples to a family of distributions and then drawing a new set of samples from this model distribution for the next update. This ability to regenerate samples allows rejection filtering inference to avoid this loss of support for the approximation to the posterior.

There are a number of models for the prior and posterior that can be considered. For convenience, a unimodal Gaussian distribution is used in some examples disclosed herein. Gaussian mixture models can also be used, but the slightly improved stability provided by allowing multimodal prior and posterior distributions generally does not compensate for the increased complexity of such models.

Gaussian models for the posterior distribution provide a number of advantages. First, they are parameterized by the posterior mean and covariance matrix which give an estimate of the true hypothesis and the associated uncertainty. Furthermore, these quantities are typically easy to estimate from the accepted samples and can be computed incrementally, allowing calculations to be executed using near-constant memory.

Several applications to inference of parameters in quantum systems are described in detail below, including 1) eigenspectrum estimation for quantum systems that lack well characterized gates, 2) ancilla-free amplitude estimation, and 3) control map learning for small quantum devices. This last application is interesting in the context of quantum bootstrapping because it provides an inexpensive method of calibrating a set of one and two qubit gates at the beginning of a bootstrapping protocol.

Randomized Gap Estimation

Conventional approaches for learning the eigenspectrum of a Hamiltonian require ancilla qubits and well characterized gates. Disclosed herein are methods and apparatus that can efficiently estimate the eigenspectrum of a small system with no ancilla qubits and potentially using poorly characterized gates. In addition to determining the eigenspectrum of a Hamiltonian or other operator representable as a Hermitian matrix, eigenphases and gaps between eigenphases can be determined for arbitrary unitary operators.

Randomized gap estimation uses Bayesian inference in concert with random evolutions to infer the gaps between eigenphases of a unitary or other operator. In one example in which gaps between eigenvalues of a Hamiltonian operator H are estimated, a first step involves preparing a predetermined state such as:

$$|\Psi\rangle := U_j|0\rangle = \sum_k \beta_k |v_k\rangle, \qquad (3)$$

wherein $|v_k\rangle$ is the eigenvector corresponding to eigenvalue $\lambda_k$ of the Hamiltonian operator H in an arbitrary ordering and $U_j$ is a random unitary. In Eq. (3), the $\beta_k$ are unknown parameters that depend not only on the random unitary chosen, but also the eigenbasis of H. In this example, the state $|0\rangle$ is used for convenience, but any other combination of eigenstates can be used.

For low-dimensional systems exact methods for drawing $U_j$ uniformly according to the Haar measure are known. For example, for a single qubit system $U_j$ has an Euler angle decomposition of $$U_j = R_z(\phi)R_x(\theta)R_z(\psi), \qquad (4)$$

up to an irrelevant global phase.

Next, the state $|\Psi\rangle$ is allowed to evolve according to $e^{-iHt}$ for a user-selected t. This results in the state $$e^{-iHt}|\Psi\rangle = e^{-iHt}U_j|0\rangle. \qquad (5)$$

For evaluation of an arbitrary unitary V, instead of time evolution (i.e., $e^{-iHt}$), the unitary V is applied a user-selected number of times m to the state $|\Psi\rangle$.

Next, the unitary $U_j^\dagger$ is applied, and the result is measured in the computational basis (and with respect to the initial state), which returns 0 with ---
Algorithm 1 Bayesian inference algorithm for eigenphases
---
Input: Set of unitary operators $\{U_j : j = 1 : K\}$, evolution time t, prior over gaps $P(\Delta)$.
  Prepare state $|0\rangle \in \mathbb{C}^N$.
  Randomly select $U_j$ from set of unitary operations.
  $|0\rangle\ U_j^\dagger e U^{-iHt} U_j |0\rangle$.
  Measure state and $E \leftarrow 0$ if the result is 0 otherwise $E \leftarrow 1$.
  Use approximate Bayesian inference to estimate $P(\Delta|E) \propto$
  $\int P(E|\Delta; t, U)\mu(U)dU P(\Delta)$.
  return $P(\Delta|E)$.
--- probability $$P(0 | H; t, U_j) := |\langle 0|U_j^\dagger e^{-iHt} U_j|0\rangle|^2 \qquad (6)$$

$$= \left(\sum_k |\beta_k|^2 \cos(\lambda_k t)\right)^2 + \left(\sum_k |\beta_k|^2 \sin(\lambda_k t)\right)^2$$

$$= \sum_{ij} \cos((\lambda_i - \lambda_j)t)|\beta_i|^2 |\beta_j|^2$$

$$:= P(0 | \Delta; t, U_j).$$

More generally, if an initial state other than $|0\rangle$ is used for evaluation of an arbitrary unitary V that is applied m times (analogous to allowing time-evolution of the Hamiltonian operator $e^{-iHt}$), then the measurement and resulting probability can be expressed as:

$$P(0|V;M,U_j) := |\langle \Phi|U_j^\dagger V^M U_j|\Phi\rangle|^2$$

wherein $|\Phi\rangle$ is an arbitrary state. However, as a convenient example, gap estimation is typically described herein with reference to $e^{-iHt}$.

Note that the gaps $\Delta_{ij} = \lambda_i - \lambda_j$ cannot be easily learned from this expression because of the unknown $\beta_i$ and $\beta_j$ terms. Haar averaging provides a solution to this problem.

Given that an unknown Haar-random unitary $U_j$ is used in the circuit, the likelihood of measuring 0 is given by the law of conditional probability as:

$$P(0|\Delta;t) = \int P(0|\Delta;t,U)\mu(U)dU, \qquad (7)$$

wherein $\mu$ is the Haar-measure over $U(N)$. This probability is distinct from the likelihood that would be used if the user knew or could compute $P(0|H; t, U_j)$ for the particular $U_j$ that was used.

Defining $\Delta$ to be a matrix such that $\Delta_{i,j} := \lambda_i - \lambda_j$, then the Haar average evaluates to $$P(0 | \Delta; t) := N\langle|\beta_i|^4\rangle + \langle|\beta_i|^2 |\beta_j|^2\rangle_{i\neq j} \sum_{i\neq j} \cos(\Delta_{ij} t) \qquad (8)$$

$$= \frac{2}{N+1}\left(1 + \frac{1}{N}\sum_{i>j} \cos(\Delta_{ij} t)\right).$$

Eq. (8) provides a likelihood function that can be used to perform Bayesian inference. In particular, Bayes' rule states that if a binary experiment is performed wherein the only two outcomes are $|0\rangle$ and $|v\neq 0\rangle$, the latter occurs with probability $1 - P(0|H; t)$. If the prior distribution over eigenvalues is defined as $P(\lambda)$, then given a measurement of 0 is recorded, Bayes' rule states that the posterior distribution is $$P(\lambda | 0; t) = \frac{2\left(1 + \frac{1}{N}\sum_{i>j}\cos(\Delta_{ij} t)\right)P(\lambda)}{(N+1)P(0)}, \qquad (9)$$

wherein $P(0)$ is a normalization factor. Thus Bayesian inference allows the gaps to be learned from such experiments. Algorithm 1 above illustrates a representative method of learning eigenvalue gaps in this way.

Since the likelihood of observing '0' in (9) scales inversely with N, the number of experiments required to learn the spectrum should grow at least linearly with N. The Cramér-Rao bound allows determination of a minimum number of experiments and/or experimental time needed ensure that the variance of $\Delta_{ij}$ is sufficiently small. Assuming R experiments are performed each with $D \in O(1)$ outcomes and evolution time at least t, then the elements of the Fisher matrix are $$I_{ij,kl} = \sum_{d_1=0}^{D-1} \cdots \sum_{d_R=0}^{D-1} \frac{\partial_{\Delta_{ij}} \prod_{q=1}^{R} P(d_q | \Delta) \partial_{\Delta_{kl}} \prod_{q=1}^{R} P(d_q | \Delta)}{\prod_{q=1}^{R} P(d_q | \Delta)} \in O\left(\frac{R^2 t^2}{N^2}\right), \quad (10)$$

which through the use of the Cramér-Rao bound implies that the variance of any unbiased estimator of $\Delta_{ij}$ after all R experiments scales at least as $\Omega(N^2/R^2 t^2)$.

While this shows that the number of experiments needed to learn the gaps grows at least linearly with N, the uncertainty in the optimal unbiased estimator also shrinks as $\Omega(1/T)$, where T is the total evolution time. The error scaling is hence quadratically smaller than would be expected from statistical sampling. This opens up the possibility of very high precision frequency estimates for small quantum devices.

A further challenge is that the eigenvalues cannot be uniquely learned from the gaps. In fact, inferring the eigenspectrum from the gaps is equivalent to the well-known turnpike problem that has either zero or an integer-power of 2 possible solutions, upper bounded by $O(N^{2.465})$. However, in typical cases there are at most 2 solutions. Additional experiments are needed to select the appropriate solution, but the gaps, are determined unambiguously.

Although the inference problem is expected to become rapidly intractable for large systems, Bayesian inference can rapidly estimate unknown frequencies in one and two qubit systems. FIGS. 1A-1C show median error and uncertainty in determining gaps in Hamiltonian eigenphases using rejection filtering for 2-level, 3-level, and 4-level Hamiltonians, respectively, with eigenspectra drawn from the Gaussian Unitary Ensemble. As shown below, adiabatic evolution can be used to apply Haar random unitaries on a subspace of a total Hilbert space to allow ancilla-free gap estimation for large quantum devices.

Figure 2:
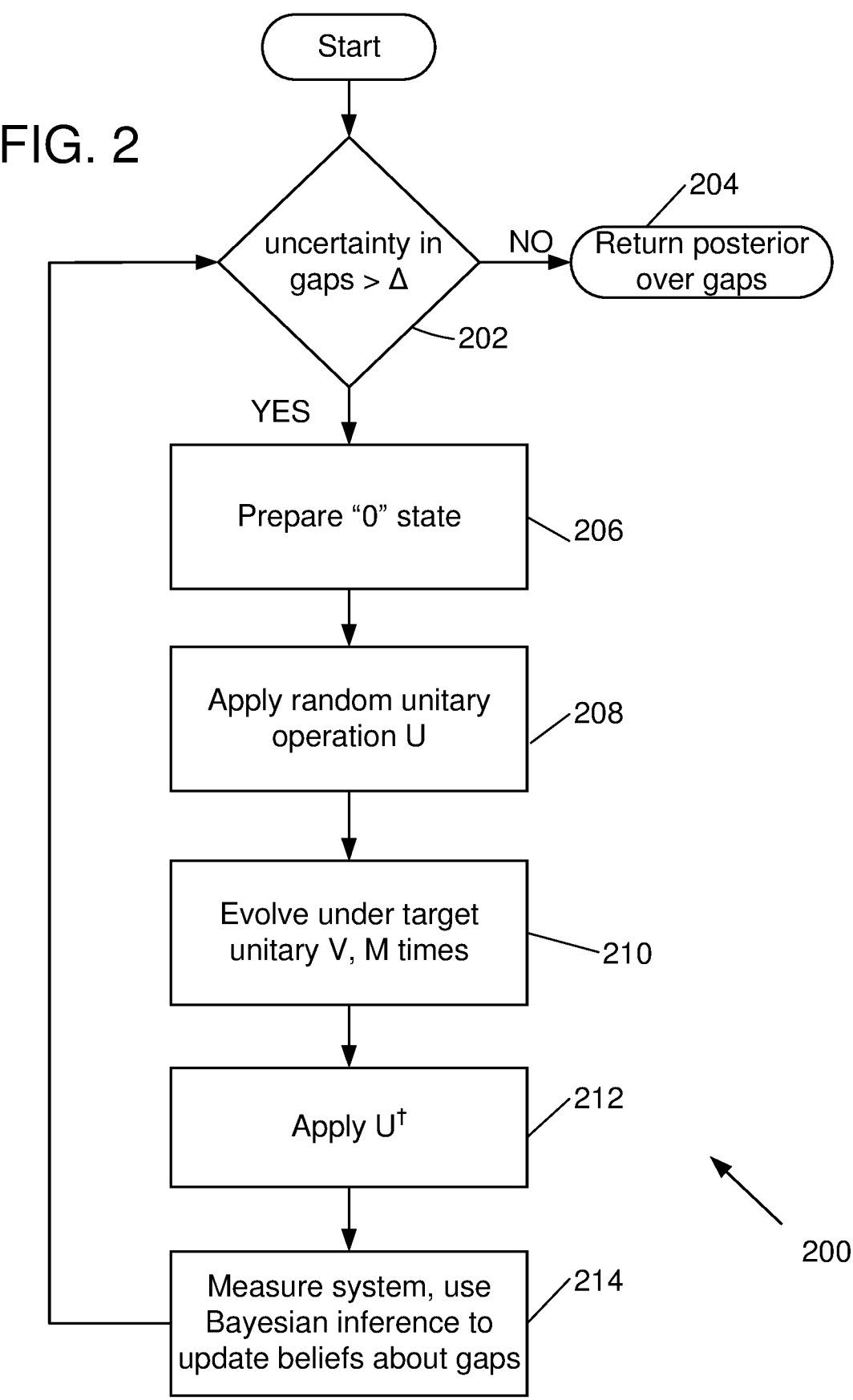
FIG. 2 illustrates a representative method of estimating eigenphase gaps.

A representative method 200 of estimating gaps associated with eigenphases of a unitary V is further illustrated in FIG. 2. At 202, uncertainty in gap estimates is evaluated to determine if gap estimates are satisfactory. If the gap estimates are satisfactory, a posterior over the gaps is returned at 204. Otherwise, at 206, a predetermined state such as a '0' state is prepared. At 208, a random unitary operation U is applied to the predetermined state. The predetermined state can be a '0' state or other state as may be convenient. In some examples, the predetermined state is established in a small set of qubits, typically fewer than 2, 4, 8, or 10 qubits, but larger numbers of qubits can be used. At 210, the unitary V is applied M times to the predetermined state. If the unitary is based on a Hamiltonian H, the predetermined state is allowed to evolve for a time t, effectively applying the operator $e^{-iHt}$.

After multiple applications of V (or time-evolution), an inverse $U^\dagger$ of the random unitary U is applied at 212, and the resulting state is measured with respect to the predetermined state. Based on the measurement, an updated prior is obtained at 214. The updated prior is evaluated at 202, to determine if additional processing is necessary.

Figure 3:
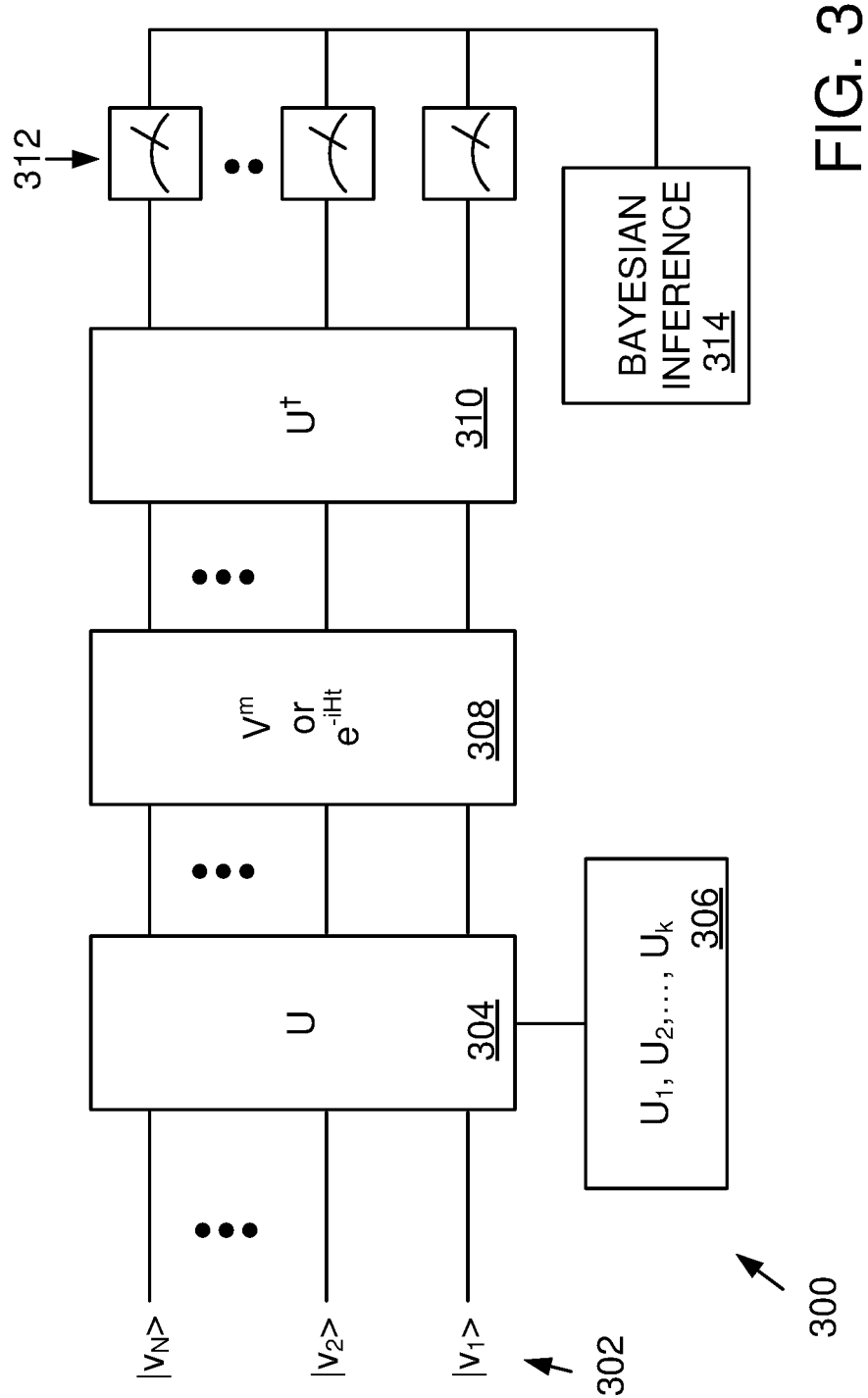
FIG. 3 illustrates a representative quantum circuit system for estimating eigenphase gaps.

A representative quantum circuit for use with the method of FIG. 2 is illustrated in FIG. 3. A plurality of qubits 302 is prepared in a predetermined state and coupled to a quantum circuit 304 that implements a random unitary U selected from a set of random unitaries 306. For Hamiltonians, the state output by the quantum circuit is allowed to time-evolve as $e^{-iHt}$, while other unitaries V are applied m times by one or more circuits 308. At 310, an inverse of the random unitary U is applied and states of the qubits are measured with measurement devices 312. A classical or other processing system performs Bayesian inference based on the measurements at 314. Operation of the circuit 300 can be repeated multiple times by drawing different random unitaries from the set 306.

Adiabatic Elimination of Eigenvalues

Most eigenvalue estimation tasks in quantum computing focus on learning only a part of the spectrum rather than all the eigenvalues. Randomized gap estimation can be used to obtain eigenvalues a part of the spectrum if Haar-random unitary operations can be applied in only that subspace. Since the eigenvectors of the Hamiltonian are generally not known, it is difficult to do this directly. Despite this fact, the adiabatic theorem provides a means by which these random unitaries can be applied to the appropriate subspace by employing adiabatic state preparation.

Assume that the spectrum, up to an additive constant, for a given subspace of a Hamiltonian $H_p$ is to be learned. In particular let $S = \text{span}(|\lambda_{j_1}\rangle, \ldots, |\lambda_{j_m}\rangle)$ be a subspace of eigenvectors of $H_p$ such that the eigenvalues obey $\lambda_1 \leq \lambda_2 \leq \ldots$ and j is a monotonically increasing sequence on $\{0, \ldots, 2^n - 1\}$. Then define an adiabatic interpolation to be a time-dependent Hamiltonian of the form H(s) such that $H(0) = H_0$ and $H(1) = H_p$ where H(s) is at least three-times differentiable for all $s \in (0, 1)$ (wherein s is a dimensionless evolution time) and furthermore has a gapped spectrum for all times in this interval. A representative example of such a Hamiltonian is:

$$H(s) = (1-s)H_0 + sH_p. \quad (11)$$

Adiabatic theorems show that for $S_0 = \text{span}(|\lambda_{j_1}^0\rangle, \ldots, |\lambda_{j_m}^0\rangle)$, wherein $|\lambda_j^0\rangle$ is an eigenvector of $H_0$ whose eigenvalue corresponds to that of $|\lambda_j\rangle$ in the sorted list of eigenvalues, then $$\mathcal{T} e^{-i \int_0^1 H(s) ds T} |\lambda_{j_k}^0\rangle = e^{i \omega_{j_k} T} |\lambda_{j_k}\rangle + O(1/T). \quad (12)$$

Eq. (12) shows that, if a Haar-random unitary is performed on $S_0$, the resultant state can be adiabatically transformed to a Haar random state in S up to phases on each of the eigenvectors and error $O(1/T)$. This error scaling can be improved exponentially by using boundary cancellation methods.

Let $U_j$ be a Haar-random unitary acting on $S_0$. Then an adiabatic protocol for estimating the eigenphase is:

$$P(0|H;t,U_j) = |\langle 0|U_j^\dagger (\mathcal{T} e^{i \int_0^1 H(s) ds T}) e^{-iH_p t}$$
$$(\mathcal{T} e^{-i \int_0^1 H(s) ds T}) U_j |0\rangle|^2. \quad (13)$$

Here $\mathcal{T}$ is known as the time-ordering operator and is defined such that the solution to the matrix differential equation $$\partial_x U(x) = -iH(x)U(x), \quad (14)$$

has solution $\mathcal{T} (e^{-i\int_0^T H(x)dx})$ at time T. Now let $U_j|0\rangle = \sum_{j:|\lambda_j\rangle \subset S_0} \alpha_j |\lambda_j^0\rangle$ and let $\tilde{U}_j|0\rangle := \sum_{j:|\lambda_j\rangle \in S} \alpha_j |\lambda_j\rangle$. Then (12) shows that $$\left(\mathcal{T} e^{-i\int_0^1 H(s)dsT}\right) U_j | 0\rangle = \sum_{j:|\lambda_j\rangle \in S_0} \alpha_j e^{i\omega_j T} |\lambda_j\rangle + O(1/T). \quad (15)$$

Then using the fact that $H_p|\lambda_j\rangle = \lambda_j|\lambda_j\rangle$ it is apparent from (13) and (15) that $$P(0 \mid H; t, U_j) = \left(\sum_{k:|\lambda_k\rangle \in S} |\alpha_k|^2 \cos(\lambda_k t)\right)^2 + \quad (16)$$

$$\left(\sum_{k:|\lambda_k\rangle \in S} |\alpha_k|^2 \sin(\lambda_k t)\right)^2 + O(1/T).$$

$$= \left|\langle 0| \tilde{U}_j^\dagger e^{-iH_p t} \tilde{U}_j |0\rangle\right|^2 + O(1/T).$$

Adiabatic evolution can therefore be used to perform phase estimation on a specified subspace of eigenvalues if there exists a gapped adiabatic path between a Hamiltonian that is diagonal in the computational basis and the problem Hamiltonian. A representative procedure is illustrated as Algorithm 2. This shows that the problem of

| Algorithm 2 Bayesian inference algorithm for eigenphases |
|---|
| Input: Set of unitary operators $\{U_j : j = 1 : K\}$ such that $U_j = I \oplus V_j$ where V acts on a $M \leq N$ dimensional subspace of the computational basis, a diagonal Hamiltonian $H_0$, annealing time T, an interpolation function $f : [0, 1] \mapsto [0, 1]$ such that $f(0) = 1 - f(1) = 0$, evolution time t and prior over M smallest gaps gaps $P(\Delta)$.<br>Prepare state $|0\rangle \in \mathbb{C}^N$.<br>Randomly select $U_j$ from set of unitary operations.<br>$|0\rangle \leftarrow U_j\dagger(\mathcal{T} e^{-i\int_0^t (1 - f(s))H_0 + f(s)HdsT})\dagger e^{-iHt}(\mathcal{T} e^{-i\int_0^t 1 - f(s))H_0 + f(s)HdsT}) U_j|0\rangle$.<br>Measure state and $E \leftarrow 0$ if the result is 0 otherwise $E \leftarrow 1$.<br>Use approximate Bayesian inference to estimate $P(\Delta|E) \propto \int P(E|\Delta;t, U)\mu(U)dUP(\Delta)$.<br>return $P(\Delta|E)$. | dimensionality that afflicts this method can be overcome in cases where such an adiabatic evolution is possible.

Figure 4:
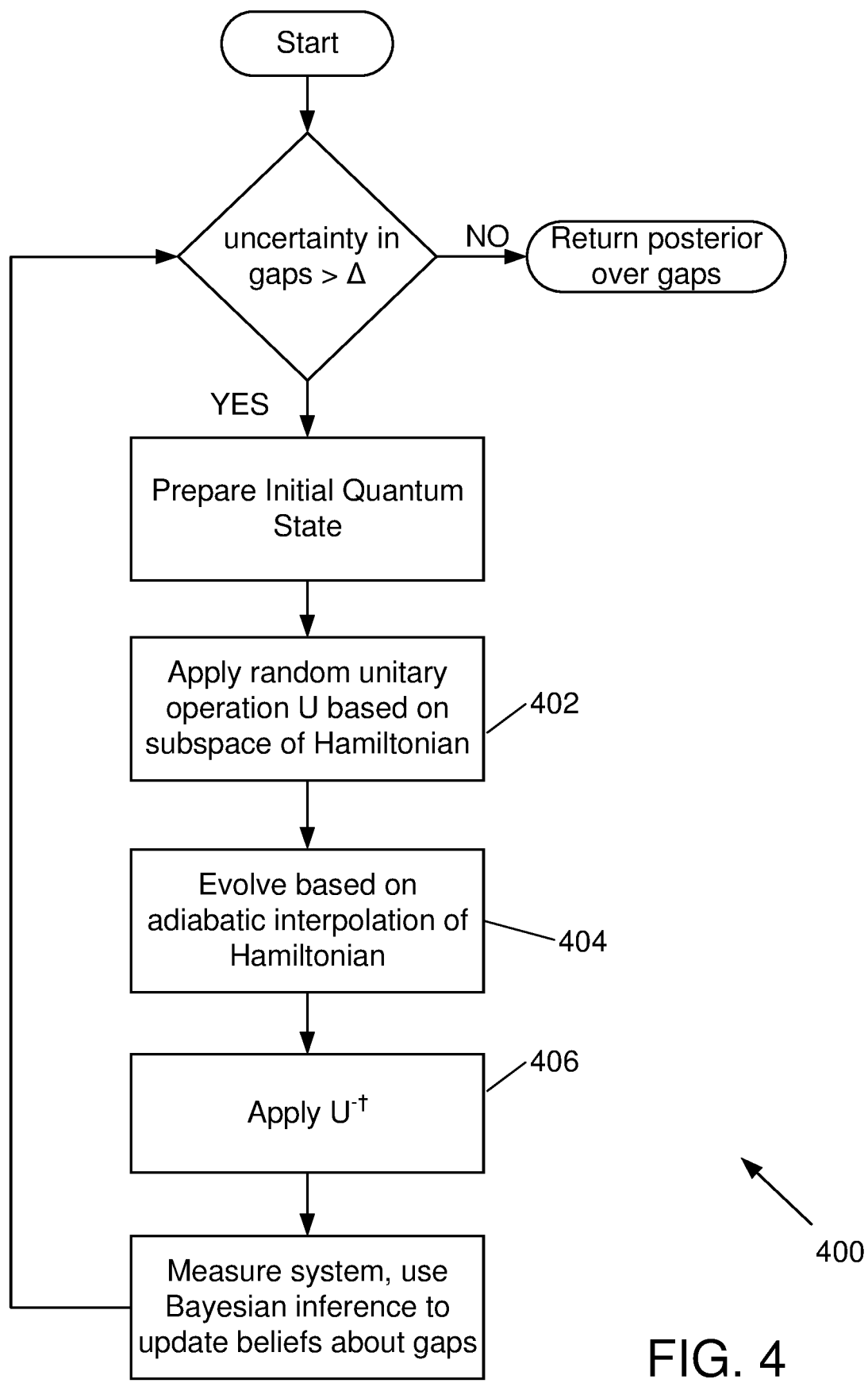
FIG. 4 illustrates a representative method of estimating eigenphase gaps based on a subspace of a time-evolving Hamiltonian.

FIG. 4 illustrates a method 400 of phase estimation on a specified subspace, illustrating similarities to the method of FIG. 2. At 402 a random unitary operator is applied, but this random unitary acts on the specified subspace. At 404, the quantum state produced by the random unitary is evolved based on an adiabatically evolved Hamiltonian such as shown in (12)-(15) above. At 406, an inverse of the random unitary is applied.

Implementing Random Unitaries

The methods and systems described above use random unitaries. In low dimensional systems, there are a number of methods that can be used to perform random or pseudorandom unitary operations. The most direct approach is to exploit an Euler angle decomposition of U(N) to generate the unitary. For example, for $U \in SU(2)$, such a unitary can be implemented as $$U = R_z(\beta) R_y(\gamma) R_z(\delta). \quad (17)$$

In order to pick such a unitary uniformly according to the Haar measure it suffices to pick $\theta := \gamma/2 \in [0, \pi/2]$, $\phi := (\beta + \delta)/2$ mod $2\pi \in [0, 2\pi)$ and $\psi := (\beta - \delta)/2$ mod $2\pi \in [0, 2\pi)$ chosen according to the following probability density function:

$$dP(\phi, \theta, \psi) = \sin(2\theta) d\phi d\theta d\psi. \quad (18)$$

Such constructions also are known for higher-dimensional systems as well.

In practice, Haar-random unitary matrices are hard to exactly implement on a quantum computer. This task can be more challenging in an uncalibrated device. Fortunately, efficient methods for implementing pseudorandom unitaries are well known. For convenience, some representative methods are briefly described herein. Here we use the definition of t-design given by Dankert et al., Physical Review A, 0(1):012304 (2009), wherein a unitary t-design on N dimensions is taken to be a finite set of unitary operations such that the average of any polynomial function of degree at most t in the matrix elements and at most degree t in their complex conjugates agrees with the Haar average. In particular, let $P_{(t,t)}(U_k)$ be such a polynomial function and assume that there are K elements in this design then $$\frac{1}{K} \sum_{k=1}^{K} P_{(t,t)}(U_k) = \int P_{(t,t)}(U) \mu(U) dU, \quad (19)$$

where $\mu$ is the Haar-measure.

More generally one can also consider the notion of an $\epsilon$-approximate t-design. This notion differs from a t-design in that strict equality is not required and a discrepancy of at most $\epsilon$ in the diamond-distance is permitted. Specifically, let $G_W(\rho) = \sum_i U_i^{\otimes k} \rho (U_i^\dagger)^{\otimes k}$ be a superoperator corresponding to twirling the input operator over the elements of the design and $G_H(\rho) = \int U^{\otimes k} \rho (U^\dagger)^{\otimes k} \mu(U) dU$ be the same quantity averaged over the Haar-measure. Then the set of unitary operators forms a $\epsilon$-approximate k-design if $\|G_W - G_H\|_\diamond \leq \epsilon$, where the diamond norm is discussed in detail in John Watrous, Theory of Quantum Information, University of Waterloo (2011).

This definition implies that the Haar-expectations of the terms can be found using a 2-design since all such terms are quadratic in the matrix elements of $U_j$ and their complex conjugates. The remaining question is how to form such a design.

Dankert et al. show that random Clifford operations can be used to form exact and $\epsilon$-approximate 2-designs at cost $O(n^2)$ and $O(n \log(1/\epsilon))$ respectively. These results are sufficient in settings where the device has access to well characterized Clifford gates. If the system does not have such gates, the result of Harrow and Low (see Harrow and Low, "Random quantum circuits are approximate 2-designs," Communications in Mathematical Physics, 291(1):257-302

(2009)) can be applied to show that $\epsilon$-approximate t-designs can be formed out of random sequences of gates taken from any universal gate set. This is significant because the gates do not need to be known for this result to hold. The number of gates needed to generate such a pseudo-random unitary is $\tilde{O}(n(n \log(1/\epsilon)))$ in such cases, wherein the multiplicative constant depends on the details of the universal gate set used.

Amplitude Estimation

Randomized gap estimation also provides an important simplification for amplitude estimation, a quantum algorithm in which the probability of an outcome occurring is estimated by combining ideas from amplitude amplification and phase estimation. The algorithm is significant because it allows a quadratic reduction in the number of queries needed to learn an answer from a Monte-Carlo algorithm. Specifically, imagine that you are given an unknown quantum state of the form $$|\psi\rangle := A|0\rangle = a|\phi\rangle + \sqrt{1-|a|^2}|\phi^\perp\rangle, \quad (20)$$

where $|\phi\rangle \in \mathbb{C}^N$, A is a unitary operator and $|a| \in (0, 1)$. Furthermore, assume that you are given access to an oracle such that $\chi|\phi\rangle = -|\phi\rangle$ and for all states $|v\rangle$ orthogonal to $|\phi\rangle$, $\chi|v\rangle = |v\rangle$. Amplitude estimation then allows $|a|^2$ to be estimated to within error $\epsilon$ using $\tilde{O}(1/\epsilon)$ applications of $\chi$ and $O(\log(1/\epsilon))$ measurements.

In order to understand how this works, consider the Grover search operator $Q=-A\chi_0 A^\dagger \chi$, wherein $\chi_0$ acts as $\chi$ would for $\phi=0$. For the case of a single marked state, $$Q^j|\psi\rangle = \sin([2j+1]\theta_a)|\phi\rangle + \cos([2j+1]\theta_a)|\phi^\perp\rangle, \quad (21)$$

wherein $\theta_a := \sin^{-1}(a)$. It is then clear that Q enacts a rotation in this two-dimensional subspace and has eigenvectors $$|\psi\pm\rangle = \frac{1}{\sqrt{2}}(|\phi\rangle \pm i|\phi^\perp\rangle), \quad (22)$$

wherein $$Q|\psi_\pm\rangle = e^{\pm i2\theta_a}|\psi_\pm\rangle. \quad (23)$$

All other eigenvectors in the space orthogonal to this have eigenvalue $\pm 1$.

These phases can be found using randomized gap estimation. The most significant change is that here t (corresponding to an evolution time as discussed above) must be taken to be an integer since fractional applications of the Grover oracle have not been assumed. (In contrast, evolution of a Hamiltonian can be based on arbitrary value of t.) In this case, the eigenvalues are in the set $\{-2\theta_a, 0, 2\theta_a, \pi\}$, which implies that $|\Delta_{i,j}|$ takes the values $\{0, \pm 2\theta_a, 4\theta_a, \pi \pm 2\theta_a\}$. This means that the gap estimation process has very different likelihoods if t is even or odd. Since $\cos([\pi \pm 2\theta_a](2p+1)) = -\cos(2\theta_a(2p+1))$, for integer p, many of the terms in (8) cancel if t is odd. As a result, it is better to choose t to be an even integer for this application, in which case the likelihood function is $$P(0 | \theta_a; t) = \quad (24)$$

$$\frac{2}{N+1}\left(1 + \frac{1}{N}\left(\binom{N-2}{2}\right) + 2(N-2)\cos(2\theta_a t) + \cos(4\theta_a t)\right).$$

Such experiments typically are not particularly suitable as $N \to \infty$ according to (10) and additional approaches are typically needed to make large N instances tractable unless sampling according to the Haar measure can be done only within the relevant subspace.

This method is, however, well-suited without modification for small N. To illustrate this, consider the case where N=2, where the likelihood function reduces to $$P(0 | \theta_a; t) = \frac{2}{3}\left(\frac{1}{2} + \cos^2(2\theta_a t)\right). \quad (25)$$

This likelihood function yields only slightly less information than the one for iterative phase estimation, $P(0|\theta_a; t) = \cos^2(2\theta_a t)$, as their derivatives with respect to $\theta_a$ differ by at most a factor of ⅔. This observation, coupled with the fact that an additional qubit is not needed, means that amplitude estimation can be realistically applied in-place (without ancillas) in single qubit devices using this method.

Figure 5:
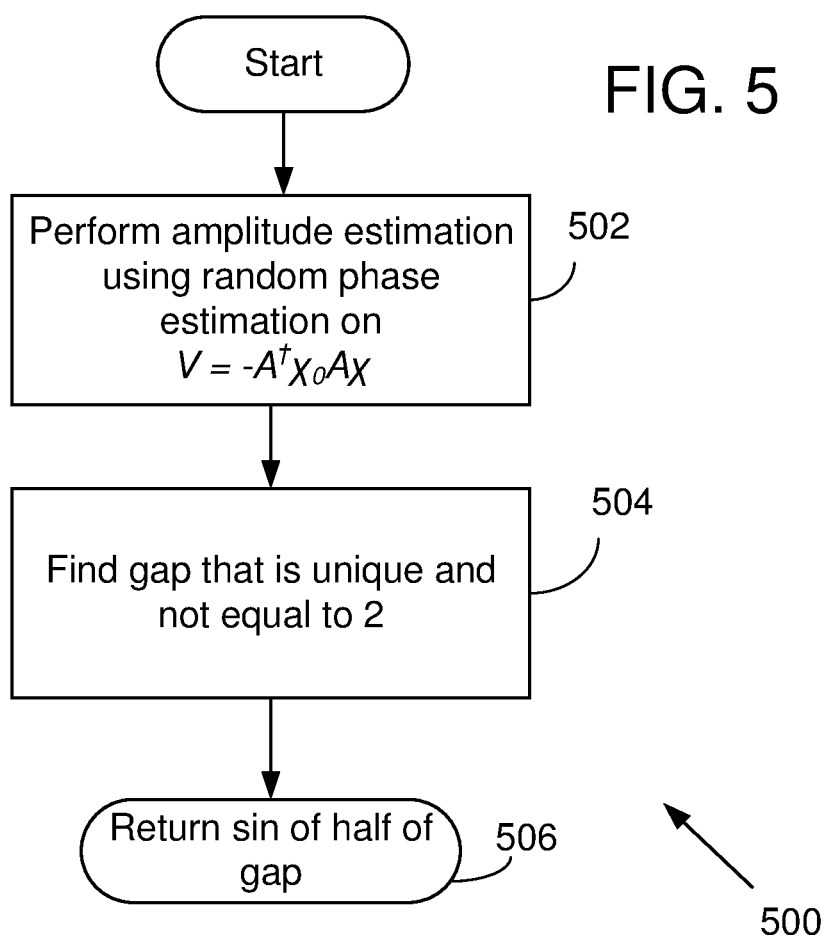
FIG. 5 illustrates a representative method of estimating eigenphase gaps applied to a Grover operator.

As shown in FIG. 5, a method 500 includes performing amplitude estimation using random phase estimation on a Groves operator at 502. At 504, a unique eigenvalue gap is found that is not equal to two, and a sin of one-half of the eigenvalue gap is returned at 506.

In large scale, fault tolerant quantum computers the cost of an additional ancilla qubit is expected to be minimal so this approach may not be needed. However, at present such ancillae come at a heavy price and the ability to learn amplitudes using quadratically fewer measurements can be valuable.

Control Map Learning

One important application of the disclosed methods and apparatus is in the calibration of quantum devices. In order to understand why this can be a problem, imagine that a qubit is to be calibrated so that an X gate can be performed within error $10^{-5}$. In order to verify that the error is this small, roughly $10^{10}$ experiments are needed. This process would also have to be repeated for every quantum bit in the system, which could easily result in terabytes of data needed to calibrate a small, fault tolerant quantum device. The disclosed methods can exponentially reduce the number of measurements needed to control such a qubit and polynomially reduce the experimental time needed.

As an example, consider the problem of learning a control map. The control map is defined to be the mapping between a set of experimental controls (specified by the vector c) and the system Hamiltonian. Specifically if we define $H(x) = \sum_{i=1}^N x_i H_i$ for a set of Hamiltonians $H_i$ then x is given by c via $$x = Gc + x_0, \quad (26)$$

wherein the matrix G is known as the control map. For simplicity we will only consider the linear case where $x_0 = 0$ below. The general case is handled by first learning $x_0$ and is discussed in Wiebe at al, "Quantum bootstrapping via compressed Hamiltonian learning," New Journal of Physics 17(2):022005 (2015).

Quantum bootstrapping has been proposed to learn such maps efficiently wherein a trusted quantum simulator is used to infer the controls of an untrusted device. Although this can allow the control map to be learned using a polylogarithmic number of experiments, it necessitates the use of swap gates that couple the device to the trusted simulator that is used to characterize it. This means that verifying that the trusted simulator is properly working can still require an exponential number of measurements (even under assumptions of locality). This is significant because the error in the trusted simulator places a lower limit on the error that can be attained.

It is worth noting that although Bayesian inference does not correctly infer a true control map for a system, it does infer a set of controls that precisely mimics a trusted simulator. In this sense, the learning task can be thought of as a machine learning task wherein the untrusted device is trained to maximize the fidelity of its output with that of the "trusted" simulator wherein the output state can be thought of as the training data for the problem. It is therefore crucial to have a well calibrated trusted device to leverage the full power of quantum bootstrapping. The first step in building a trusted simulator is to calibrate the single qubit gates.

Two Level Example

Assume that a Hamiltonian is of the form $$H([\alpha,\beta,\gamma])=\alpha X+\beta Y+\gamma Z. \tag{27}$$

X, Y, and Z are Pauli gates. Since these three operations anti-commute it is easy to see that the eigenvalues of this Hamiltonian are $$E=\pm\sqrt{\alpha^2+\beta^2+\gamma^2}. \tag{28}$$

Thus information about $\alpha$, $\beta$ and $\gamma$ and in turn G can be inferred from the eigenspectra of different experiments. Specifically, $$\begin{bmatrix}\alpha\\\beta\\\gamma\end{bmatrix}=\begin{bmatrix}G_{00}&G_{01}&G_{02}\\G_{10}&G_{11}&G_{12}\\G_{20}&G_{21}&G_{22}\end{bmatrix}\begin{bmatrix}c_1\\c_2\\c_3\end{bmatrix}. \tag{29}$$

The simplest example of control map learning is the diagonal case. If the control map is diagonal, then $$E=\pm\sqrt{G_{00}^2c_1^2+G_{11}^2c_2^2+G_{22}^2c_3^2}. \tag{30}$$

In this case the control map can be learned, up to signs of $G_{ij}$, using a sequence of three randomized phase estimation procedures as discussed above with c=[1, 0, 0], [0, 1, 0] and [0, 0, 1] to determine eigenvalue gaps. The signs can be inexpensively learned using auxiliary experiments because only a single bit of information is required. Thus empirically the number of experiments required to learn G using randomized phase estimation is upper bounded by a constant times log(1/ϵ).

The next simplest case to consider is that of an upper triangular control map with a positive diagonal in the form $$\begin{bmatrix}\alpha\\\beta\\\gamma\end{bmatrix}=\begin{bmatrix}G_{00}&G_{01}&G_{02}\\0&G_{11}&G_{12}\\0&0&G_{22}\end{bmatrix}\begin{bmatrix}c_1\\c_2\\c_3\end{bmatrix}. \tag{31}$$

Clearly $G_{00}$ can be learned directly with randomized gap estimation using the prior experiments. However, the remaining elements must be inferred from different randomized gap determinations. For c=[1, 1, 0] and c=[0, 1, 0], then $$E([1,1,0])=\pm\sqrt{(G_{00}+G_{01})^2+G_{11}^2} \tag{32}$$

$$E([0,1,0])=\pm\sqrt{G_{01}^2+G_{11}^2}. \tag{33}$$

After squaring and subtracting both equations, $$E^2([1,1,0])-E^2([0,1,0])=G_{00}^2+2G_{00}G_{01}, \tag{34}$$

which can be solved uniquely for $G_{01}$ since $G_{00}$ is known. Once $G_{01}$ is known, $G_{11}$ can be learned unambiguously from (33) using the fact that $G_{11} \geq 0$.

After these steps, the first two columns of G have been obtained. The remaining column can be learned similarly by performing three randomized gap estimation experiments with c=[0, 0, 1], [1, 0, 1] and [0, 1, 1] which yield $$E([0,1,1])=\pm\sqrt{(G_{01}+G_{02})^2+(G_{11}+G_{12})^2+G_{22}^2} \tag{35}$$

$$E([1,0,1])=\pm\sqrt{(G_{00}+G_{02})^2+G_{12}^2+G_{22}^2} \tag{36}$$

$$E([0,0,1])=\pm\sqrt{G_{02}^2+G_{12}^2+G_{22}^2}. \tag{37}$$

Then by subtracting the square of (37) from (36) we learn $G_{02}$, from which we learn $G_{12}$ from substituting the result into (35). $G_{22}$ can then be learned by subtracting the square of (36) from (35), substituting the value of $G_{02}$ and using $G_{22} \geq 0$.

More generally, this approach provides information about the inner product between any two columns of G. No more information about G can be extracted with such measurements. That is, $G^T G$ can be learned, but G itself is only determined up to an orthogonal transformation G'=QG which preserves the inner products of its columns. The matrix Q can further be determined only if additional constraints are imposed on G. For example, if G is upper or lower triangular and with a positive diagonal it is unique within such measurements and Q is the identity matrix as discussed above.

2 by 2 Single Qubit Control Maps

As mentioned above, gap estimation experiments alone are in general not enough to uniquely specify the control map. In fact, amplitudes of the states in the eigenbasis are required. This raises the question of whether amplitude estimation may be used to glean the necessary information from these coefficients using O(log(1/ϵ)) measurements.

For simplicity, consider the Hamiltonian for a single qubit with $\beta=0$.
Hence $$H([\alpha,\gamma])=\alpha X+\gamma Z. \tag{38}$$

and $$\begin{bmatrix}\alpha\\\gamma\end{bmatrix}=\begin{bmatrix}G_{00}&G_{01}\\G_{10}&G_{11}\end{bmatrix}\begin{bmatrix}c_1\\c_2\end{bmatrix}. \tag{39}$$

Randomized gap estimation can provide $$E_{10}=\pm\sqrt{G_{00}^2+G_{10}^2}$$

$$E_{01}=\pm\sqrt{G_{01}^2+G_{11}^2}$$

$$E_{11}=\pm\sqrt{(G_{00}+G_{01})^2+(G_{10}+G_{11})^2}, \tag{40}$$

In order to see how the last constraint can be obtained from amplitude estimation, assume for the moment that we can apply an exact Z-gate. Then we will provide the additional information needed to specify G by applying amplitude estimation on the following three operators while marking the |0⟩ state, wherein each of these operators is associated with a corresponding value of c=[0, 1], [1, 0], [1, 1], wherein the operators A are defined as:

$$A_{01} = e^{-i(G_{01}X + G_{11}Z)\pi/(2E_{01})},$$

$$A_{10} = e^{-i(G_{10}Z + G_{00}X)\pi/(2E_{10})},$$

$$A_{11} = e^{-i((G_{10}+G_{11})Z + (G_{00}+G_{01})X)\pi/(2E_{11})}. \quad (41)$$

In the above equations, $A_{01} = A([0, 1])$, $A_{10} = A([1, 0])$, and $A_{11} = A([1, 1])$.

We can then use these operators to obtain the following amplitudes using randomized gap estimation:

$$|a_{01}| = |\langle 0|A_{01}|0\rangle| = \left|\frac{G_{11}}{E_{01}}\right|, \quad (42)$$

$$|a_{10}| = |\langle 0|A_{10}|0\rangle| = \left|\frac{G_{10}}{E_{10}}\right|, \quad (43)$$

$$|a_{11}| = |\langle 0|A_{11}|0\rangle| = \left|\frac{G_{10} + G_{11}}{E_{11}}\right|. \quad (44)$$

If the sign of $G_{11}$ or $G_{10}$ is known, these three quantities are enough to unambiguously solve for $G_{11}$ and $G_{10}$, and can all be learned in-place using randomized amplitude estimation. The remaining elements of the control map can then be found from (40). If the sign of $G_{11}$ or $G_{10}$ is not known, then they can be learned with amplitude estimation if unitary gates that prepare the states $(|0\rangle \pm i|1\rangle)/\sqrt{2}$ can be performed by the quantum device.

In the absence of a calibrated Z gate, the above strategy of amplitude estimation does not apply. The requisite quantities $|a_{01}|$, $|a_{10}|$ and $|a_{11}|$ can nonetheless be learned by statistical sampling. Doing so requires $O(1/\epsilon^2)$ experiments, which dominates the cost of data acquisition. However, randomized gap estimation efficiently provides $E_{01}$, $E_{10}$ and $E_{11}$ which allows us to optimally extract these expectation values (for the form of the experiments considered). To see this consider the case of learning $|a_{01}|$ for arbitrary t. The likelihood function is $$P(0|G;t) = \cos^2(E_{01}t) + \sin^2(E_{01}t)|a_{01}|^2. \quad (45)$$

It is then clear that the Fisher information is maximized at evolution time $t = \pi/(2E_{01})$. In order to compare let us consider the case where $E_{01}t$ mod $2\pi$ is taken from a uniform prior over 0, $2\pi$. Then the marginalized likelihood is $$\frac{1}{2\pi}\int_0^{2\pi} dx \cos^2(x) + \sin^2(x)|a_{01}|^2 = \frac{|a_{10}|^2 + 1}{2}. \quad (46)$$

thus (10) shows that the Fisher information for such experiments is reduced by a factor of 2. This furthermore reduces the inference problem to frequency estimation wherein the non-adaptive strategy of estimating $|a_{01}|^2$ using the sample frequency is optimal. Thus even though randomized gap estimation does not lead to a quadratic reduction in the experimental time needed to learn G here, it dramatically simplifies the inference problem and removes the need to use multiple experimental settings to learn these amplitudes.

Figure 6:
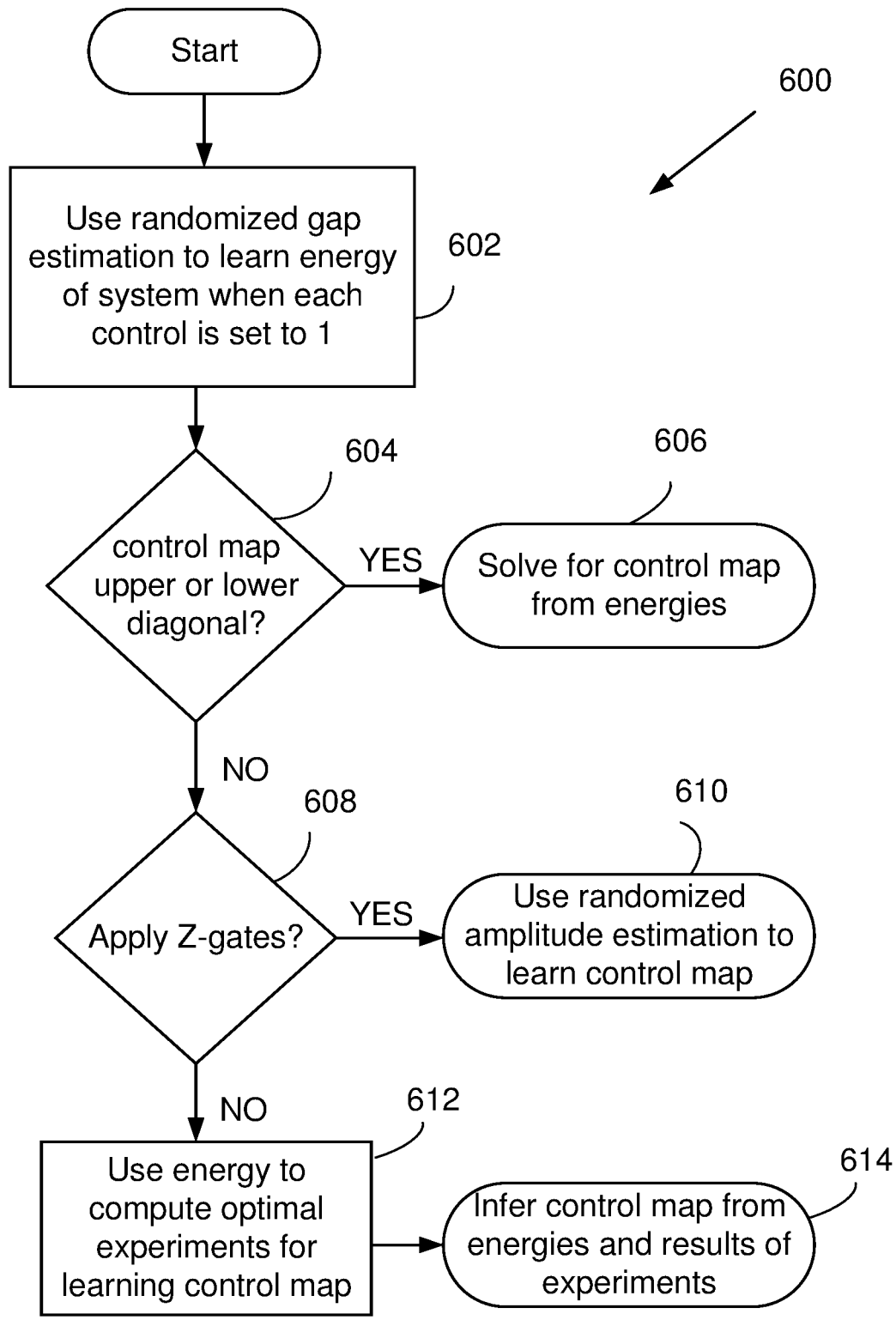
FIG. 6 illustrates a representative method of determining a control map.

FIG. 6 illustrates representative method 600 of obtaining a control map. Randomized gap estimation is used at 602 to learn system energies when each control is set to 1. At 604, the control map is evaluated to determine if it is upper or lower diagonal. If so, a control map can be obtained from the energies at 606. If not the control map is not upper or lower diagonal, it is determined if a Z-gate can be applied as 608. If so, randomized amplitude estimation is used to obtain a control map at 610. Otherwise, the energies are used to select measurements to be executed to obtain the control map at 612. The control map is then inferred from the energies and the selected measurements at 614.

The case of a single qubit Hamiltonian with uncalibrated X and Z interactions is discussed above. The case of a general (traceless) single qubit Hamiltonian follows from exactly the same reasoning. First one applies randomized gap estimation to learn the relevant energies corresponding to the 6 linearly independent sets of controls. The remaining 3 equations are found by measuring appropriate expectation values using amplitude estimation if a Z gate is available, and statistical sampling if it is not.

Finally, higher dimensional control maps can also be learned using this approach. The analytic discussion given above no longer holds unless the Hamiltonian can be decomposed into a set of anti-commuting Pauli operators. The same process can, however, be applied numerically in such cases.

The Turnpike Problem for Unique Gaps

Eigenvalues are not directly provided in randomized phase estimation. Instead the eigenvalues for the system must be inferred from the gaps. Bayesian inference is used to infer the eigenvalues from but it remains an open question under what circumstances it can successfully infer the eigenvalues from the gaps. As is shown below, for typical spectra, wherein the spectral gaps are unique, there are at most two degenerate choices of spectra that could equivalently describe the system.

Theorem 1. Let $\{\lambda_1 := 0 < \lambda_2 < \ldots < \lambda_N\}$ be a set such that for any $i \neq k$ $(\lambda_{i+1} - \lambda_i) \neq (\lambda_{k+1} - \lambda_k)$ Given $\Delta$: $\Delta_{xy} = \lambda_{px} - \lambda_{qy}$ for unknown permutations of $\{1, \ldots, N\}$ p and q, there are only two possible solutions for the values of $\lambda$.

Proof. The nearest neighbor gaps can be isolated from this set easily. Consider $\lambda_{i+2} - \lambda_i = \lambda_{i+2} - \lambda_{i+1} + \lambda_{i+1} - \lambda_j$. Since $\lambda_{i+2} - \lambda_{i+1}$ and $\lambda_{i+1} - \lambda_i$ are in $\Delta$ it follows that such a gap can be decomposed into a sum of gaps in the set. Similarly, by induction $\lambda_{i+x} - \lambda_i$ can be decomposed into a sum of nearest neighbor gaps for all $x \geq 2$. In contrast, the nearest neighbor difference $\lambda_{i+2} - \lambda_{i+1}$ cannot be decomposed into a sum of other gaps because of our assumptions of uniqueness. This means that $\Delta^1$, the set of all nearest neighbor gaps, can be uniquely identified from this data.

It remains to show that there are only two ways that these gaps can be laid out to form a spectrum that is self consistent with the data in $\Delta$. Given $\Delta_{xy}$, $\lambda_N$ can be identified from the spectrum since it is simply the largest gap under the assumption that $\lambda_1 = 0$. The second largest gap can also be uniquely found from this data. There are two possibilities either the second largest gap is $\lambda_{N-1}$ or it is $\lambda_N - \lambda_2$. This can be seen by contradiction. Imagine $\lambda_N - \lambda_j$ is the second largest gap for $j \geq 3$. Since $\lambda_j$ is a monotonically increasing sequence, $\lambda_N - \lambda_j \leq \lambda_N - \lambda_2 \leq \lambda_N$. Therefore it cannot be the second largest gap. Applying the same argument to $\lambda_{N-1} - \lambda_j$ for $j \geq 2$ leads to the conclusion that $\lambda_{N-1}$ is the only other candidate for the second largest gap. Similarly $\lambda_x - \lambda_j \leq \lambda_{N-1} - \lambda_j$ for all $x \leq N-1$ so these are the only two possible candidates.

Assume that the second largest gap is $\lambda_{N-1}$ then $$\lambda_{N-2} = (\lambda_{N-2} - \lambda_{N-1}) + \lambda_{N-1}.$$

Seeking a contradiction imagine there is an alternative solution to this such that $$\lambda_p - \lambda_{N-1} = (\lambda_{r-1} - \lambda_r).$$

If $\lambda_p - \lambda_{N-1}$ is not a nearest-neighbor gap then we have a contradiction since the set of nearest-neighbor gaps is known and each gap is unique hence we can immediately deduce that $\lambda_p$ is not a solution unless $p \in \{N-2, N\}$. Given $\lambda_p - \lambda_{N-1}$ is a nearest neighbor gap we must have that $p=N-2$ or $p=N$. Since the nearest neighbor gaps are unique $\lambda_{N-2} - \lambda_{N-1} \neq \lambda_{N-1} - \lambda_N$ and since we already know $\lambda_N - \lambda_{N-1}$ this confusion is impossible. Furthermore, the uniqueness of the nearest neighbor gaps imply that the only possible solution is $r=N-1$. Thus the choice of $\lambda_{N-2}$ is unique.

This process can be repeated using $\lambda_p$ and $\lambda_{p+1}$ for any $P<N$ and similarly must lead to a unique solution. Therefore given the second largest gap is $\lambda_{N-1}$, the spectrum is unique.

Now let us assume that the second largest gap is $\lambda_N - \lambda_2$. Then $\lambda_2$ is known because $\lambda_N$ is. By repeating the exact same argument used above we see that $\lambda_3$ is uniquely determined by these two values and the uniqueness of the nearest neighbor gaps. This same argument can be extended leading to the conclusion that if $\lambda_2$ is $\lambda_N$ minus the second largest gap then the spectrum is also unique. Ergo there are at most two possible spectra based on this data.

This approach shows that a solution exists to the turnpike problem (up to a reflection of the spectrum about its midpoint) if the gaps are unique. However, no efficient algorithm is known for solving the turnpike algorithm in the presence of degenerate gaps. While a backtracking algorithm is known that can typically find a solution to the problem in time $O(N^2 \log(N))$, in general it requires time $O(2^N N \log(N))$. This suggests that Bayesian inference will not always find a solution in time that is polynomial in N, which itself is exponential in the number of qubits. Also note that Haar-Random unitaries are exponentially difficult to prepare; however, this ensemble of Haar-random unitaries can be approximated by a unitary 2-design which can be formed using random sequences of Clifford operations.

$$|\Psi\rangle := U_j|0\rangle = \sum_k \beta_k |v_k\rangle \tag{47}$$

$$\sum_k |\beta_k|^2 = 1 \tag{48}$$

$$L = |\langle\Psi|e^{-iHt}|\Psi\rangle|^2 = \left|\left(\sum_k \beta_k^* \langle v_k|\right)\left(\sum_k \beta_k e^{-i\lambda_k t}|v_k\rangle\right)\right|^2 \tag{49}$$

$$= \left|\sum_k |\beta_k|^2 e^{-i\lambda_k t}\right|^2 = \left(\sum_k |\beta_k|^2 \cos(\lambda_k t)\right)^2 + \tag{50}$$

$$\left(\sum_k |\beta_k|^2 \sin(\lambda_k t)\right)^2$$

$$= \sum_{ij} \cos(\Delta_{ij} t)|\beta_i|^2 |\beta_j|^2 \tag{51}$$

The number of parameters in the phase estimation depends the number of eigenstates of the Hamiltonian which are required to represent the input states.

Given input states are sampled according to the Haar measure, the expectation value of the likelihood only depends on the gaps in the eigenspectrum of the Hamiltonian. Hence we do not have enough information to resolve the actual eigenspectrum of the system. However, this is still useful. For example, the spectral norm of the Hamiltonian, given by the difference between the smallest and largest eigenvalue, can be found. Also, the smallest gap in the system, which is also a lower bound for the gap between the ground and first excited states is found. This can be used to estimate an optimal annealing schedule for adiabatic algorithms.

$$\langle L \rangle = \tag{52}$$

$$N\langle|\beta_i|^4\rangle + \langle|\beta_i|^2 |\beta_j|^2\rangle_{i \neq j} \sum_{i \neq j} \cos(\Delta_{ij} t) = \frac{2}{N+1}\left(1 + \frac{1}{N} \sum_{i>j} \cos(\Delta_{ij} t)\right)$$

$$\langle L \rangle_{t=0} = 1 \tag{53}$$

$$\langle|\beta_i|^4\rangle = \frac{2}{N(N+1)} \tag{54}$$

With more energy levels resolving the parameters becomes significantly more expensive. There are two main effects. Firstly, a random input state effectively becomes scrambled as the number of levels increases. For a fixed timestep t, if Hamiltonians are drawn from the Gaussian Unitary Ensemble, the expectation value of the likelihood falls off on average linearly with the number of levels. Hence, the number of experiments required to resolve it increases linearly, or exponentially with the number of qubits, given all levels are measured. A second effect is degeneracies in the likelihood function. Depending on the eigenspectrum, this results in equal values of the likelihood for different sets of parameters. If a single Gaussian is used as a model, the convergence rate of the inference will be significantly reduced if multiple degeneracies are within the support of the model as it is not able to properly resolve the multiple peaks in the likelihood. One solution is to instead use a multi-modal mixture model to resolve all the peaks. However, with each resampling step, this requires a more complex refitting procedure, such as expectation maximisation, which can itself get stuck in local optima. Another approach is to modify the likelihood function in the simulation to 'pick' one of the global optima, or at least reduce the degeneracy by breaking some symmetries. For example, we can force the eigenvalues to be sorted and positive by introducing an additional sign term in the likelihood function $$\langle L \rangle = \frac{2}{N+1}\left(+\frac{1}{N} \sum_{i>j} \text{sign}(\Delta_{ij}) \cos(\Delta_{ij} t)\right) \tag{55}$$

where the sign-function is +1 if its argument is positive and −1 otherwise. Hence, this likelihood will align with the experimental likelihood at all timesteps t only if $\lambda_i > \lambda_j$. However, with 4 or more levels the likelihood is still degenerate and further non-trivial modifications need to be added to break them. Another problem with such modifications is that the likelihood can be larger than unity or smaller than zero for some sets of parameters. If this is the case, a crude workaround, which is use here, is to simply force it to be physical, for example $\langle L \rangle \leftarrow \min(\max(\langle L \rangle, 0), 1)$. With this approach, however, the inference could become unstable if the likelihood is significantly outside the interval.

Quantum and Classical Processing Environments

Figure 7:
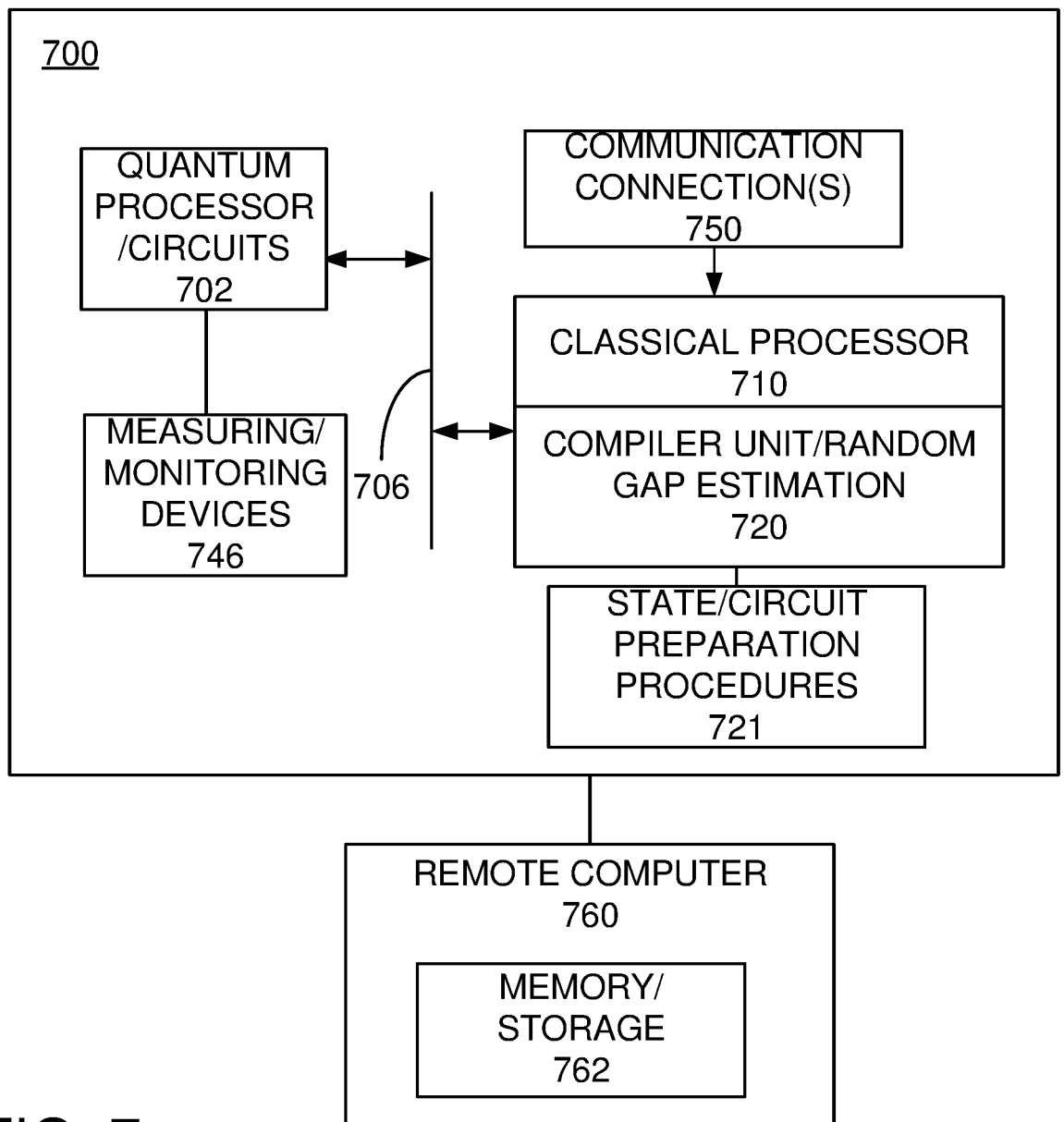
FIG. 7 is a block diagram of a representative computing environment that includes classical and quantum processing for randomized gap and amplitude estimation and defining associated quantum circuits and operations.

With reference to FIG. 7, an exemplary system for implementing some aspects of the disclosed technology includes a computing environment 700 that includes a quantum processing unit 702 and one or more monitoring/measuring device(s) 746. The quantum processor executes quantum circuits (such as the circuits of FIG. 3) that are precompiled by classical compiler unit 720 utilizing one or more classical processor(s) 710. With reference to FIG. 7, the compilation is the process of translation of a high-level description of a quantum algorithm into a sequence of quantum circuits. Such high-level description may be stored, as the case may be, on one or more external computer(s) 760 outside the computing environment 700 utilizing one or more memory and/or storage device(s) 762, then downloaded as necessary into the computing environment 700 via one or more communication connection(s) 750. Alternatively, the classical compiler unit 720 is coupled to a classical processor 710 and a procedure library 721 that contains some or all procedures or data necessary to implement the methods described above such as randomized gap estimation and defining random unitary circuits such as those of FIG. 3. A communication bus couples instructions and data to and from the quantum processor 702, the measuring and monitoring devices 746, and the classical processor 720. In this way, circuit definitions from the compiler unit 720 or measurement results from the measuring and monitoring devices 746 (or other data) can be communicated.

Figure 8:
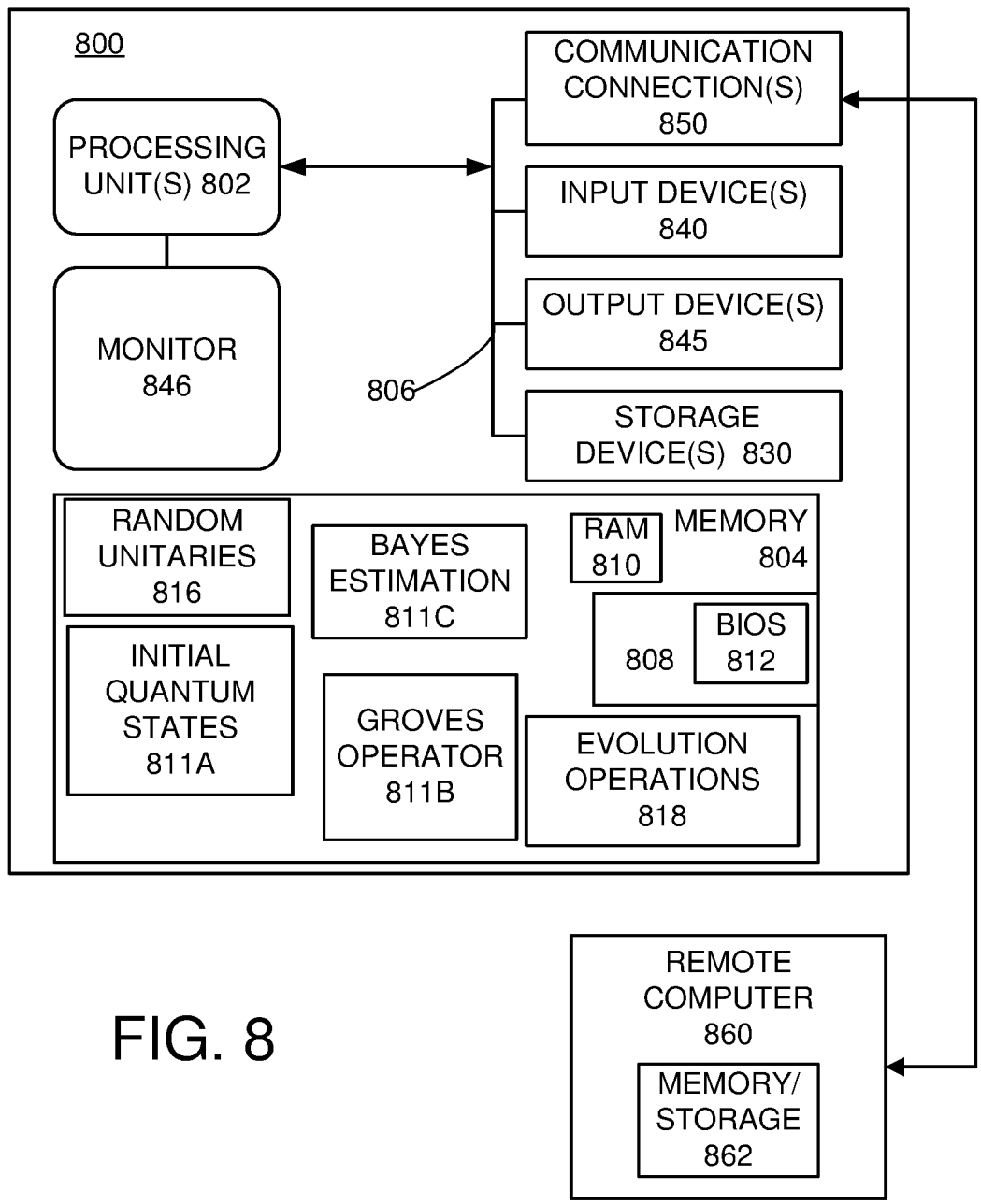
FIG. 8 illustrates a representative classical computer that is configured to define quantum circuits for randomized gap and amplitude estimation and processing quantum measurements for Bayesian inference.

FIG. 8 and the following discussion are intended to provide a brief, general description of an exemplary computing environment in which the disclosed technology may be implemented. Although not required, the disclosed technology is described in the general context of computer executable instructions, such as program modules, being executed by a personal computer (PC). Generally, program modules include routines, programs, objects, components, data structures, etc., that perform particular tasks or implement particular abstract data types. Moreover, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices. Typically, a classical computing environment is coupled to a quantum computing environment, but a quantum computing environment is not shown in FIG. 8.

With reference to FIG. 8, an exemplary system for implementing the disclosed technology includes a general purpose computing device in the form of an exemplary conventional PC 800, including one or more processing units 802, a system memory 804, and a system bus 806 that couples various system components including the system memory 804 to the one or more processing units 802. The system bus 806 may be any of several types of bus structures including a memory bus or memory controller, a peripheral bus, and a local bus using any of a variety of bus architectures. The exemplary system memory 804 includes read only memory (ROM) 808 and random access memory (RAM) 810. A basic input/output system (BIOS) 812, containing the basic routines that help with the transfer of information between elements within the PC 800, is stored in ROM 808.

As shown in FIG. 8, a specification of random unitaries or related procedures are stored in a memory portion 816. Instructions and specifications for initial quantum states are stored at 811A. Procedures for Bayesian estimation are stored at 811C, Grove operator specifications are stored at 811B, and processor-executable instructions for defining quantum circuits for evolution operations are stored at 818.

The exemplary PC 800 further includes one or more storage devices 830 such as a hard disk drive for reading from and writing to a hard disk, a magnetic disk drive for reading from or writing to a removable magnetic disk, and an optical disk drive for reading from or writing to a removable optical disk (such as a CD-ROM or other optical media). Such storage devices can be connected to the system bus 806 by a hard disk drive interface, a magnetic disk drive interface, and an optical drive interface, respectively. The drives and their associated computer readable media provide nonvolatile storage of computer-readable instructions, data structures, program modules, and other data for the PC 800. Other types of computer-readable media which can store data that is accessible by a PC, such as magnetic cassettes, flash memory cards, digital video disks, CDs, DVDs, RAMs, ROMs, and the like, may also be used in the exemplary operating environment.

A number of program modules may be stored in the storage devices 830 including an operating system, one or more application programs, other program modules, and program data. Storage of computer-executable instructions for defining randomized gap estimation circuits and procedures, and configuring a quantum computer can be stored in the storage devices 830 as well as or in addition to the memory 804. A user may enter commands and information into the PC 800 through one or more input devices 840 such as a keyboard and a pointing device such as a mouse. Other input devices may include a digital camera, microphone, joystick, game pad, satellite dish, scanner, or the like. These and other input devices are often connected to the one or more processing units 802 through a serial port interface that is coupled to the system bus 806, but may be connected by other interfaces such as a parallel port, game port, or universal serial bus (USB). A monitor 846 or other type of display device is also connected to the system bus 806 via an interface, such as a video adapter. Other peripheral output devices 845, such as speakers and printers (not shown), may be included. In some cases, a user interface is display so that a user can input a prior distribution over eigenvalue gaps, and verify successful inference of the true gaps.

The PC 800 may operate in a networked environment using logical connections to one or more remote computers, such as a remote computer 860. In some examples, one or more network or communication connections 850 are included. The remote computer 860 may be another PC, a server, a router, a network PC, or a peer device or other common network node, and typically includes many or all of the elements described above relative to the PC 800, although only a memory storage device 862 has been illustrated in FIG. 8. The personal computer 800 and/or the remote computer 860 can be connected to a logical a local area network (LAN) and a wide area network (WAN). Such networking environments are commonplace in offices, enterprise wide computer networks, intranets, and the Internet.

When used in a LAN networking environment, the PC 800 is connected to the LAN through a network interface. When used in a WAN networking environment, the PC 800 typically includes a modem or other means for establishing communications over the WAN, such as the Internet. In a networked environment, program modules depicted relative to the personal computer 800, or portions thereof, may be stored in the remote memory storage device or other locations on the LAN or WAN. The network connections shown are exemplary, and other means of establishing a communications link between the computers may be used.

In some examples, a logic device such as a field programmable gate array, other programmable logic device (PLD), an application specific integrated circuit can be used, and a general purpose processor is not necessary. As used herein, processor generally refers to logic devices that execute instructions that can be coupled to the logic device or fixed in the logic device. In some cases, logic devices include memory portions, but memory can be provided externally, as may be convenient. In addition, multiple logic devices can be arranged for parallel processing.

Whereas the invention has been described in connection with several example embodiments, it will be understood that the invention is not limited to these embodiments. On the contrary, the invention is intended to encompass all alternatives, modifications, and equivalents as may be included within the spirit and scope of the invention as defined by the appended claims.

What is claimed is:

1. A method, comprising:
   preparing an initial quantum state in at least one qubit;
   applying a random unitary to the initial quantum state to produce a random quantum state;
   evolving the random quantum state based on a target unitary;
   applying an inverse of the randomly selected unitary to the evolved quantum state to produce a final quantum state; and
   producing an estimate of an eigenvalue gap of the target unitary based on a measurement of the final quantum state with respect to the initial quantum state.

2. The method of claim 1, wherein the initial quantum state of the at least one qubit is a one state.

3. The method of claim 1, wherein the initial quantum state of the at least one qubit is a zero state.

4. The method of claim 1, wherein the target unitary is based on a Hamiltonian operator, and further comprising selecting an evolution time and allowing the random quantum state to evolve for the evolution time.

5. The method of claim 1, wherein the random quantum state is evolved by applying the target unitary a plurality of times.

6. The method of claim 1, further comprising:
   applying a set of random unitaries to associated initial quantum states in the at least one qubit to produce corresponding random quantum states;
   evolving the corresponding set of random quantum states based on the target unitary;
   applying inverses of the randomly selected unitaries to corresponding evolved quantum states to produce a set of final quantum states; and
   producing an estimate of an eigenvalue gap of the target unitary based on measurements of the set of final quantum states with respect to the associated initial quantum state of the at least one qubit.

7. The method of claim 6, wherein the initial quantum states in the at least one qubit are the same quantum state.

8. The method of claim 6, wherein the target unitary is based on a Hamiltonian operator, and further comprising selecting an evolution time and allowing the random quantum states to evolve for the evolution time under the Hamiltonian.

9. The method of claim 6, wherein the set of random quantum states is evolved by applying the target unitary a plurality times to each of the random quantum states.

10. The method of claim 6, wherein the initial quantum states in the at least one qubit includes at least two different quantum states.

11. The method of claim 6, wherein the target unitary is V and the set of random quantum states is evolved by applying the target unitary m times to the random quantum states of the set of quantum states, wherein m is an integer that is different for at least some of the random quantum states.

12. The method of claim 1, wherein the target unitary is associated with a control map, and further comprising defining a control map based on the estimated eigenvalues.

13. The method of claim 1, further comprising performing the steps of claim 1 for a plurality of unitaries associated with a control map to obtain eigenvalue gaps, and based on the eigenvalue gaps, providing an estimate of a control map.

14. The method of claim 1, wherein the target unitary is a Grover search operator and the random quantum state is evolved by applying the target unitary an even number of times.

15. The method of claim 1, wherein the target unitary is associated with a time-dependent Hamiltonian that evolves from an initial Hamiltonian to a final Hamiltonian, and the random quantum state is evolved adiabatically.

16. The method of claim 15, wherein the time-dependent Hamiltonian includes an initial Hamiltonian and a final Hamiltonian, and the random eigenvalue gap is associated with the final Hamiltonian.

17. The method of claim 16, wherein the random unitary is selected based on a subset of eigenvalues of the initial Hamiltonian.

18. A quantum computation system, comprising:
    at least one qubit;
    a set of quantum circuits implementing random unitaries and an associated set of quantum circuits implementing inverses of the random unitaries, the quantum circuits configured to be applied to the at least one qubit to produce corresponding random quantum states;
    a quantum circuit implementing a target unitary and coupled to a selected circuit implementing a random unitary from the set of quantum circuits implementing random unitaries so that the target unitary is applied to a corresponding random quantum state;
    a quantum circuit implementing the inverse of the selected quantum circuit and configured to be applied to the at least one qubit after the corresponding random quantum state is evolved to produce an output quantum states; and
    at least one measurement circuit that is coupled to the at least one qubit so as to receive and measure the output quantum state with respect to an initial state of the at least one qubit.

19. The quantum computation system of claim 18, further comprising a classical processor coupled to the at least one measurement circuit, and based on the measured output state, provide an estimate of at least one eigenvalue gap associated with the target unitary, wherein the target unitary is associated with a Hamiltonian operator and the circuit is arranged to allow state evolution based on an elapsed time, or the circuit is defined so as to allow state evolution by applying the target unitary at least m times, wherein m is an integer that is greater than 1.

20. A method, comprising:
    preparing a set of initial quantum states, wherein the set of initial quantum states can include the same or different quantum states;
    for each of the initial quantum states of the set of initial quantum states, applying a random unitary to the initial quantum state to produce an associated random quantum state, wherein at least some of the applied random quantum unitaries can be the same or different;

evolving the random quantum states based on a selected target unitary by: (1) for a target unitary associated with a Hamiltonian, allowing the random quantum states to evolve temporally, or (2) by applying the target unitary to each of the random quantum states a corresponding number of times;

applying an inverse of the applied randomly selected unitary to each of the evolved quantum states to produce a set of final quantum states; and measuring each of the final quantum states with respect to a corresponding initial quantum state; and based on Bayesian inference and the measurements of the final quantum states, producing an estimate of an eigenvalue gap of the target unitary.

\* \* \* \* \*